US009479503B2

(12) United States Patent
Griffin et al.

(10) Patent No.: US 9,479,503 B2
(45) Date of Patent: *Oct. 25, 2016

(54) AUTHENTICATING CLOUD COMPUTING ENABLING SECURE SERVICES

(71) Applicant: TeleCommunication Systems, Inc., Annapolis, MD (US)

(72) Inventors: John L. Griffin, Brookline, MA (US); Keith A. McFarland, Annapolis, MD (US); William P. Wells, Federal Way, WA (US)

(73) Assignee: Telecommunications Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/971,104

(22) Filed: Dec. 16, 2015

(65) Prior Publication Data

US 2016/0255080 A1 Sep. 1, 2016

Related U.S. Application Data

(63) Continuation of application No. 13/736,557, filed on Jan. 8, 2013.

(60) Provisional application No. 61/586,467, filed on Jan. 13, 2012.

(51) Int. Cl.
*H04L 29/06* (2006.01)
*H04L 9/32* (2006.01)

(52) U.S. Cl.
CPC ......... *H04L 63/0884* (2013.01); *H04L 9/3247* (2013.01); *H04L 63/06* (2013.01); *H04L 63/08* (2013.01); *H04L 63/083* (2013.01); *H04L 63/0861* (2013.01); *H04L 63/10* (2013.01); *H04L 63/101* (2013.01)

(58) Field of Classification Search
CPC ............ H04L 63/0884; H04L 63/083; H04L 63/0861; H04L 63/101; H04L 63/10; H04L 63/08; H04L 63/06; H04L 9/3247
See application file for complete search history.

(56) References Cited

U.S. PATENT DOCUMENTS 9,052,861 B1 * 6/2015 Pizot ..................... G06F 3/1285
2013/0061291 A1 * 3/2013 Hegg ..................... G06F 21/33
726/4

OTHER PUBLICATIONS

Gansen et al. "Trusted data sharing over untrusted cloud storage providers.", Retrieved from http://ieeexplore.ieee.org/stamp/stamp.jsp?tp=&arnumber=5708439 , Cloud Computing Technology and Science (CloudCom), 2010 IEEE Second International Conference on. IEEE, 2010.*

* cited by examiner

*Primary Examiner* — Chau Le
*Assistant Examiner* — Muhammad Chaudhry
(74) *Attorney, Agent, or Firm* — Tarolli, Sundheim, Covell & Tummino LLP

(57) ABSTRACT

Authenticating cloud computing enabling secure services (ACCESS) offloads "client authentication" activity onto a third-party authenticating cloud computing enabling secure services (ACCESS) node. Instead of having a client device authenticate itself directly to a network server, the client device instead authenticates itself to a third-party authenticating cloud computing enabling secure services (ACCESS) node. The authenticating cloud computing enabling secure services (ACCESS) node then provides credentials that are used by the client device to communicate directly with the server (and utilize the service) without any further authentication being necessary.

18 Claims, 7 Drawing Sheets

AUTHENTICATING CLOUD COMPUTING ENABLING SECURE SERVICES

This application is a continuation of U.S. patent application Ser. No. 13/736,557 entitled "Authenticating Cloud Computing Enabling Secure Services", filed on Jan. 8, 2013; which claims priority from U.S. Provisional Application No. 61/586,467, entitled "Authenticating Cloud Computing, Enabling Secure Services", filed Jan. 13, 2012, the entirety of both of which is are explicitly incorporated herein by reference.

BACKGROUND OF THE INVENTION

1. Field of the Invention

This invention relates generally to secure communications. More particularly it relates to authentication of a network device.

2. Background of the Related Art

Conventional service and network administration systems control external access to services with an authentication, access control, or gateway device at the edge of an internal network, such that the gateway device resides between the servers that provide a given service, and the clients that utilize that service. As used herein, the term "server" refers generally to one or more computer systems that work individually or cooperatively to provide a service to client devices.

FIG. 7 shows conventional authentication wherein network-level traffic management policy requires inbound traffic to be forced to pass through a gateway device.

In particular, as shown in FIG. 7, an authenticating gateway 700 resides in a given internal network 702, providing a forced bottleneck between one or more clients 704 and one or more services 710, 712. All external network traffic must pass through the authenticating gateway 700. The authenticating gateway 700 enforces security policy.

By forcing all traffic through the authenticating gateway 700, all security functions are performed by the authenticating gateway 700 (such as authentication, access control, and admission control). Doing so has a great advantage in that these functions do not then have to be included as part of the services 710, 712. Rather, only the authenticating gateway device 700 need be accounted for as part of the overall service architecture.

A core observation by the present inventors is that servers in the cloud are typically geographically or topographically decentralized. As a result, the use of an inline gateway device for security has several significant flaws for modern services in a cloud environment: (1) Lack of Scalability. All traffic to and from a service's servers must be routed through the gateway device, to ensure that the gateway device provides its security function. (2) Server co-location. Servers must be placed close (spatially and/or topographically) to the gateway device, for the gateway-to-server link not to add significant latency to service response times. (3) Inflexible Architecture. Clients must communicate with the gateway device, not with the actual servers.

Cloud computing addresses these flaws by allowing servers (and therefore services) to run with spatial and computational independence. Unfortunately, in doing so the ability to control the flow of traffic between a client and a server is lost; in particular network-level traffic routing rules can no longer be used to achieve the desired security architecture.

SUMMARY OF THE INVENTION

In accordance with the principles of the present invention, a method and apparatus for authenticating a cloud-based secure service comprises receiving a key from a service server. Credentials are received from a client device. An authentication token is passed to the client device when the credentials from the client device are pre-authorized, whereby the client device is enabled to access a service from the service server using the authentication token.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
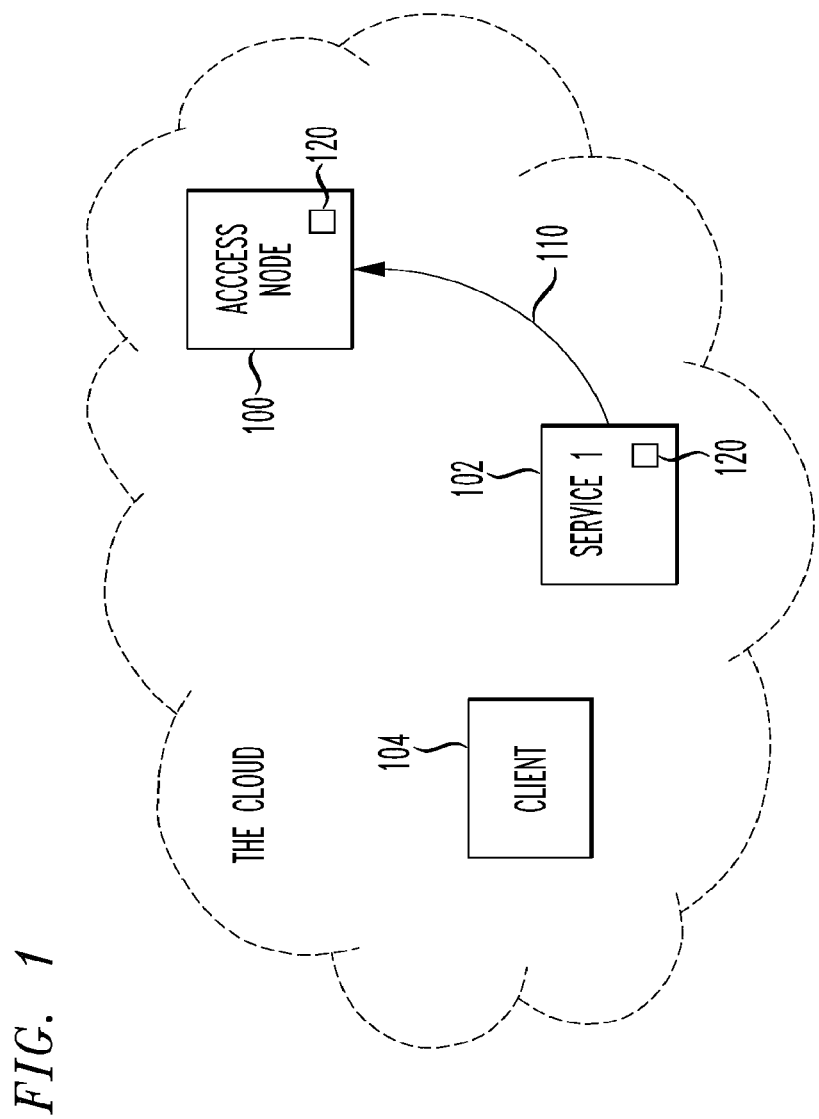
FIG. 1 shows a first exemplary step of service registration, for authenticating cloud computing enabling secure services (ACCESS), in accordance with the principles of the present invention.

The present inventors have appreciated that a conventional authenticating gateway device becomes a bottleneck as the number of services (protected by the gateway) or the amount of traffic (through the gateway) scale upwards, particularly in a cloud environment. The inventors hereof have also recognized that server co-location, particularly in a cloud environment, reduces the opportunity to geographically distribute servers for resiliency and performance. Moreover, the inventors hereof have realized that unless gateway devices are widely replicated in a cloud environment, there will seldom be a short-distance path between the client and the gateway, and the increased path length adds latency to the services provided.

The present invention enables authentication of a network device using a network service as part of an access control or admission control strategy. Conventional approaches toward mandating service security in a cloud computing environment build security activities such as authentication into the service itself. But the present inventors have appreciated that this approach is undesirable because uniform development or deployment of security activities can no longer be ensured. Rather, the inventors hereof have realized that in a cloud computing (or similar distributed computing) environment, better security mechanisms (such as authentication, access control, and admission control) are needed to work well in geographically-independent and computationally-independent environments such as the cloud.

The present invention conveys security information in a distributed (or "cloud") computing environment utilizing what is referred to herein as: authenticating cloud computing enabling secure services (ACCESS). A central tenet of authenticating cloud computing enabling secure services (ACCESS) is that a network service is enabled to offload its "client authentication" activity onto a third-party authenticating cloud computing enabling secure services (ACCESS) node, Instead of having a client authenticate itself directly to a server, the client instead authenticates itself to a third-party authenticating cloud computing enabling secure services (ACCESS) node. The authenticating cloud computing enabling secure services (ACCESS) node then provides credentials that are used by the client to communicate directly with the server (and utilize the service) without any further authentication being necessary. This separation of authentication activity from the remainder of the cloud-provided service is a specific adaptation of the present invention to the operating characteristics of a cloud environment.

The term "service administrator" as used herein generally refers to the service provider or service designer; i.e., the entity device responsible for a given service.

To begin use of authenticating cloud computing enabling secure services (ACCESS), a given service administrator first provides an ACCESS node with a list of descriptive items regarding specific security aspects to enforce. For instance, exemplary descriptive items regarding specific security aspects to enforce may include: (a) a set of secret cryptographic keys and/or certificates for use in communication and in signing authentication messages; (b) a list of users, roles, and principals; (c) sets of objects or resources to be utilized and protected by the authenticating cloud computing enabling secure services (ACCESS) protocol; and/or (d) machine-enforceable policies governing when and how the principals can utilize the resources.

FIG. 1 shows a first exemplary step of service registration, for authenticating cloud computing enabling secure services (ACCESS), in accordance with the principles of the present invention.

In particular, as shown in FIG. 1, a service server 102 provides an authenticating cloud computing enabling secure services (ACCESS) node 100 with a registration message 110 containing an authentication policy (or policies), and other appropriate information. An exemplary initial transaction between the service administrator 102 and the authenticating cloud computing enabling secure services (ACCESS) node 100 is subject to special security protections. These precautions are needed to prevent a malicious party from bypassing the authenticating cloud computing enabling secure services (ACCESS) protocol or providing invalid configuration information to the authenticating cloud computing enabling secure services (ACCESS) node 100.

In the example of FIG. 1, it is assumed that prior to the disclosed step, e.g., perhaps at the time that the service administrator 102 contracted or paid to use authenticating cloud computing enabling secure services (ACCESS)—the service server 102 and the authenticating cloud computing enabling secure services (ACCESS) node 100 exchanged cryptographic keys 120. All further communications between the service's server(s) 102 and the authenticating cloud computing enabling secure services (ACCESS) node 100 are encrypted using the shared secret represented by those cryptographic keys 120. As a result, knowledge of these cryptographic keys 120 is used as an authenticity and integrity verification over direct communications between the service server 102 and the authenticating cloud computing enabling secure services (ACCESS) node 100.

In addition, during the step shown and described with reference to FIG. 1, the service server(s) or service administrator 102 specifies in registration message 110 which of the optional service notification methods to use after a client device 104 authenticates (e.g., with a push notification or pull notification.)

Only a single authenticating cloud computing enabling secure services (ACCESS) node 100 is shown in FIG. 1. However, the authenticating cloud computing enabling secure services (ACCESS) service itself may be provided by a single node 100 or by multiple distributed nodes operating in federation. Also, the service administrator 102 may also simultaneously use multiple competing ACCESS-style security offerings, each operated independently, for clients 104 or service servers 102 to be able to choose among authentication providers. The inventors recognize that the authenticating cloud computing enabling secure services (ACCESS) system may support multiple communication protocols. The exemplary structures provided herewith in this invention may be embedded within a variety of communication protocols either defined by standards or developed for proprietary purposes.

An exemplary structure of a registration message 110 (occurring over an encrypted transport) is as follows:

Unique service instance identifier;
Service identifier status (e.g., online, offline, suspend); and
Optional notification method (e.g., push, pull, default, none).
Notification method format may be:
Unforgeable token (same format as provided to client);
Subset notification (specific parameters are identified which the service requests explicit notification on for all signed tokens.)

Depending upon the specific encryption methodology used, the shared cryptographic key(s) 120 are exchanged out-of-band or in-band between the service server 102 and the authenticating cloud computing enabling secure services (ACCESS) node(s) 100 prior to the step shown and described with reference to FIG. 1. The authenticating cloud computing enabling secure services (ACCESS) node 100 preferably supports multiple encryption methods, and more than one encryption method may be employed simultaneously by the authenticating cloud computing enabling secure services (ACCESS) node 100 for use in communications with multiple service servers 102 (and multiple services).

Figure 2:
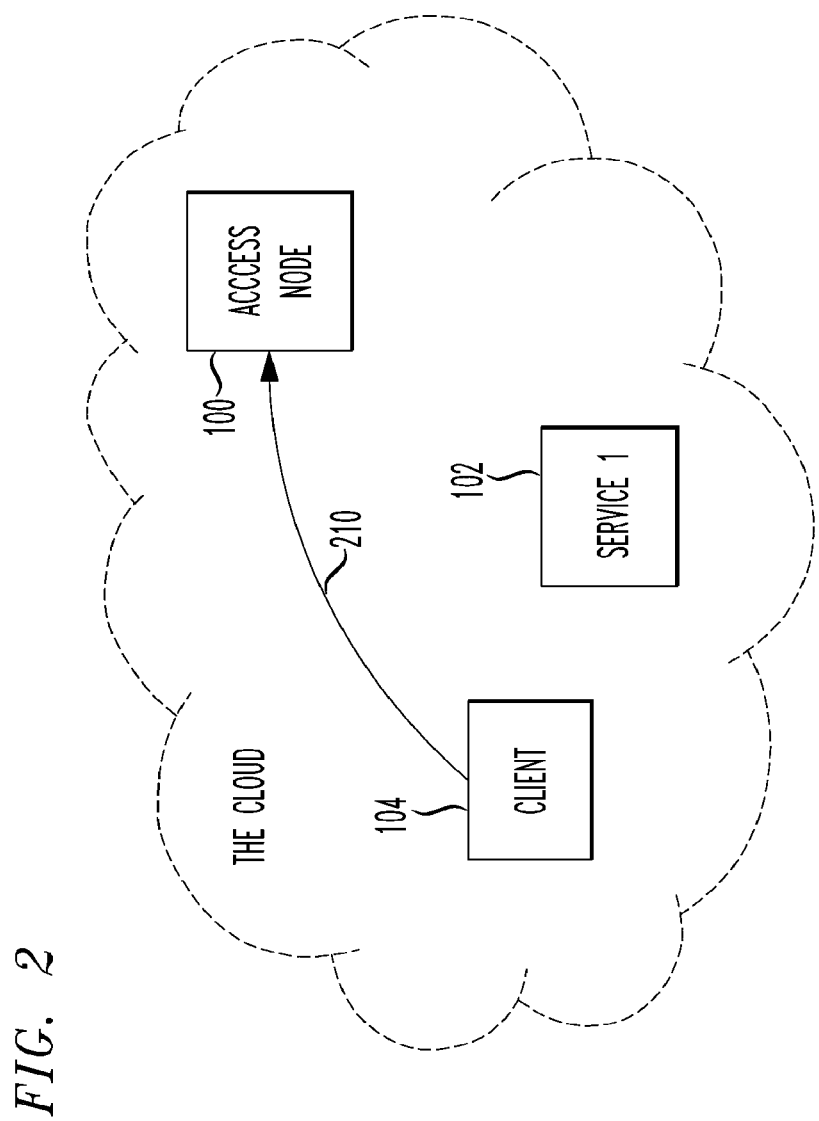
FIG. 2 shows a second exemplary step of client access request, for authenticating cloud computing enabling secure services (ACCESS), in accordance with the principles of the present invention.

FIG. 2 shows a second exemplary step of client access request, for authenticating cloud computing enabling secure services (ACCESS), in accordance with the principles of the present invention.

In particular, as shown in FIG. 2, when a given client 104 desires to utilize a given service 102, the client 104 is directed first to contact the access node 100 to authenticate or otherwise request service from the service 102.

To do so, the client 104 provides the authenticating cloud computing enabling secure services (ACCESS) node 100 with a set of key-value pairs containing preferably all of the credentials 210 for the client 104 that are required for the client 104 to use the service 102.

The credentials 210 for the client 104 necessary for client 104 to utilize a given service 102 may include, e.g., passwords, biometric data about an authorized user of the client 104, or the user's device, location information including current and previous locations and direction of travel, historical documentation regarding previous successful authentications by the client 104, use of the service 102 (or of other related services), and/or output from seeded pseudorandom number generators in possession of the client 104, among others. These credentials 210 may be provided by the client device 104, software residing thereon, or by direct input from a user of the client device 104.

All communications between the client 104 and the authenticating cloud computing enabling secure services (ACCESS) node 100 may involve encrypted transport.

FIG. 2 shows a single message being exchanged from the client 104 to the authenticating cloud computing enabling secure services (ACCESS) node 100. However, multiple messages may be sent between the client 104 and the authenticating cloud computing enabling secure services (ACCESS) node 100. For example, the client 104 may provide a minimum set of credentials 210; the authenticating cloud computing enabling secure services (ACCESS) node 100 may reject those credentials 210 as not satisfying its requirements; and the client 104 could then resubmit a broader set of credentials 210 in the hopes of gaining authentication to utilize the service 102.

Optionally, the authenticating cloud computing enabling secure services (ACCESS) node 100 may first provide a list of required minimum authentication keys. For example, the authenticating cloud computing enabling secure services (ACCESS) node 100 may convey to the client 104 that it will accept either (1) a set of key-value pairs containing two passwords; or (2) a set of key-value pairs containing one password and one piece of biometric information. In this case, the client 104 may either send all of its authentication information as credentials 210 in this step shown and described with respect to FIG. 1, or only its choice of the minimum information to satisfy authentication requirements conveyed by the authenticating cloud computing enabling secure services (ACCESS) node 100.

Figure 3:
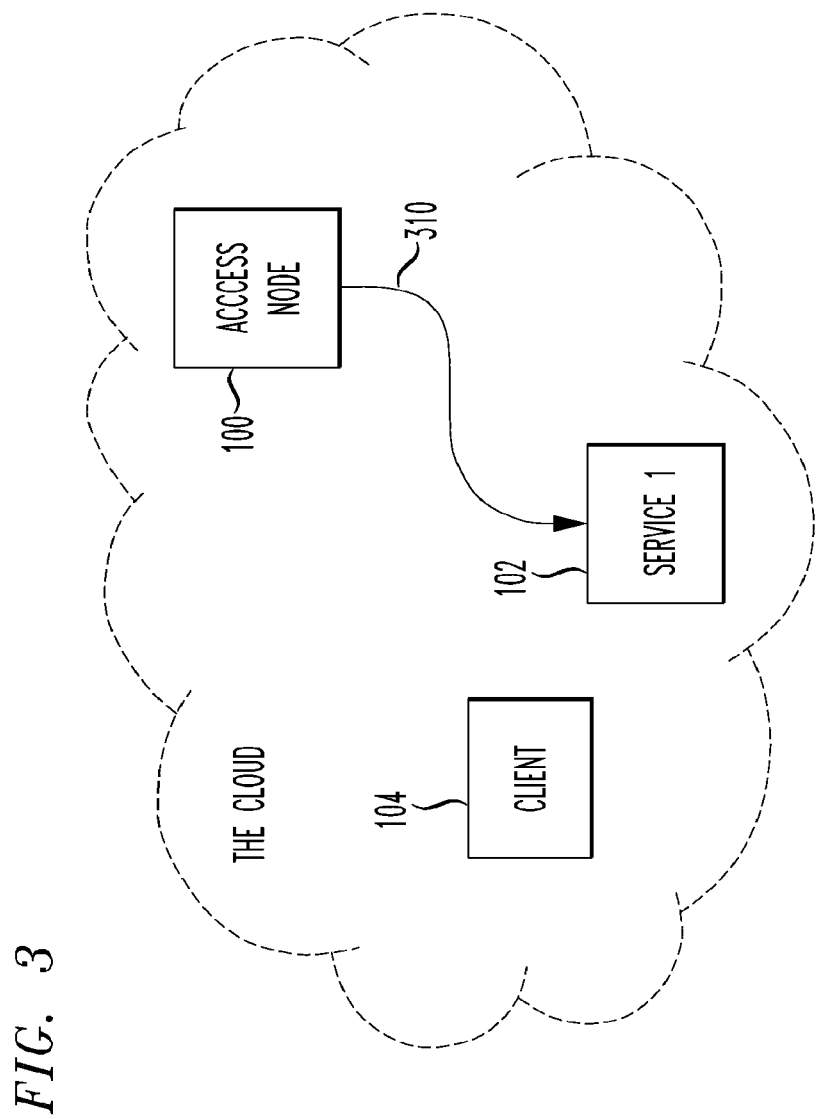
FIG. 3 shows an exemplary optional third step of a push notification, for authenticating cloud computing enabling secure services (ACCESS), in accordance with the principles of the present invention.

FIG. 3 shows an exemplary optional third step of a push notification, for authenticating cloud computing enabling secure services (ACCESS), in accordance with the principles of the present invention.

In particular, as shown in the optional step of FIG. 3, the authenticating cloud computing enabling secure services (ACCESS) node 100 may notify the service server(s) 102 directly of the results of the authentication exchange using push message 310. Push message 310 is encrypted using the shared or calculated asymmetric cryptographic keys 120 in order to provide authenticity and integrity verification over direct communications between the service server 102 and the authenticating cloud computing enabling secure services (ACCESS) node 100.

Such a "push" message, if requested by the service administrator in the step shown in FIG. 1, informs the service server(s) 102 of the identity of each authenticated client 104, This information may be used by the service server(s) 102 as part of a load balancing, data or result prefetching, or other performance-optimization strategy. "Push or Pull Notifications" are discussed further herein with respect to FIG. 6.

Figure 4:
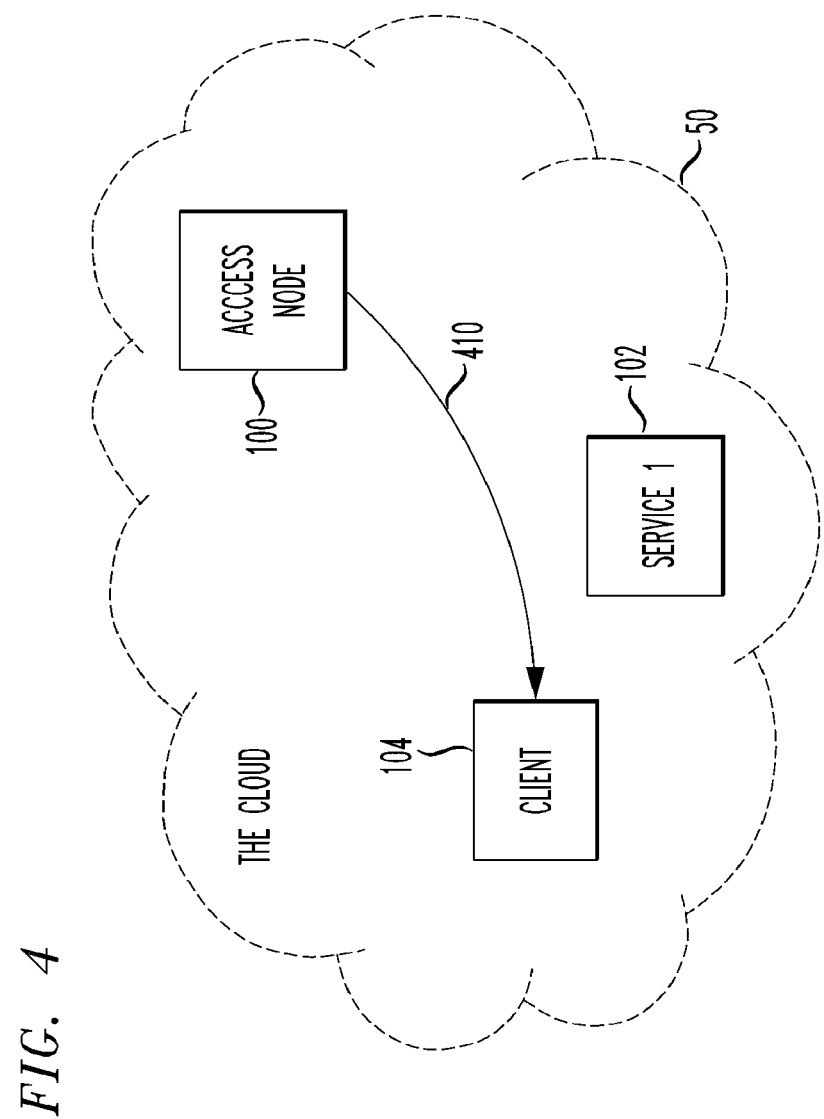
FIG. 4 shows an exemplary fourth step of token authorization to client, for authenticating cloud computing enabling secure services (ACCESS), in accordance with the principles of the present invention.

FIG. 4 shows an exemplary fourth step of token authorization to client, for authenticating cloud computing enabling secure services (ACCESS), in accordance with the principles of the present invention.

In particular, as shown in FIG. 4, if the user device client 104 is authenticated, the authenticating cloud computing enabling secure services (ACCESS) node 100 generates an unforgeable authentication token 410 (signed capability) and provides it to the client 104. While the authentication token 410 itself is typically provided to the client 104 in encrypted format, the structure of this authentication token 410 is a set of one or more key-value pairs, plus a hash value. The key-value pairs may include information representing the result of the authentication activity, including:

Client identity (as observable by the server);
Server identity or identities (as requested by the client);
Values or summary of authentication credentials provided by the client;
Timestamps, including token creation time and length of token validity;
Nonce (to prevent token reuse);
Token type (single-use/valid-until-used, multiple-use);
Token exclusivity (whether the token may be used simultaneously with other tokens);
Server exclusivity (whether the token may be used simultaneously on multiple client requests);
Privileges granted (at client's level of authentication);
Quality of Service (or QoS) granted (at client's level of authentication); and/or
Custom key-value pairs (defined by the service administrator in step #1).

The hash value represents a signature over all key-value pairs, using the shared secret information conveyed in the step of FIG. 1, following best practices for message integrity using secret-key or public-key cryptography. The authentication token 410 is "unforgeable" because it is protected using this information known only to the authenticating cloud computing enabling secure services (ACCESS) node 100 and to the service server(s) 102.

The key-value contents of the authentication token 410 itself may or may not be encrypted (using keys shared in the step of FIG. 1) depending on the configuration instructions of the service administrator in the step of FIG. 1.

In the step of FIG. 2, the client 104 is shown as contacting the authenticating cloud computing enabling secure services (ACCESS) node 100 directly. In such a case the reply from the authenticating cloud computing enabling secure services (ACCESS) node 100 in the step of FIG. 4 would include a redirect providing information on what the client 104 should do next, for example specifying which service provider 102 in the cloud 50 is best suited for the geographic or network-topographic location of the client 104. In an alternate implementation, the client 104 contacts a service server 102 directly, but (since the client 104 is not presenting an authentication token 410) the service server 102 using the communication protocol specific redirect message immediately redirects the client 104 to the authenticating cloud computing enabling secure services (ACCESS) node 100 for authentication. Conceptually both implementations are similar to how DNS redirection is currently used in web caching infrastructures. Additionally, an unseen network element may intercept an attempted unauthorized communication initiated by the client 104 going to the service server 102. If the client's 104 unauthorized communication attempt is intercepted it may be redirected by this unseen network element to the authenticating cloud computing enabling secure services (ACCESS) node 100 for authentication.

The authentication tokens 410 as provided by the authenticating cloud computing enabling secure services (ACCESS) node 100 provide authorization control based upon three categories: Token format, access control, and user restrictions.

Token Format:

During the authenticating cloud computing enabling secure services (ACCESS) node provisioning shown in the step of FIG. 1, the service administrator of the service server 102 specifies what sort(s) of authentication token(s) should be created by the authenticating cloud computing enabling secure services (ACCESS) node 100 (given a set of principles and objects that it has authenticated under a policy), or simply states that the authenticating cloud computing enabling secure services (ACCESS) node 100 may use a default format to convey the authentication token 410.

Access Controls:

Depending on the service environment, this authentication token 410 may either grant full access to the client device 104 service 102, or it may provide fine-grained access control ("capabilities") for what actions the client 104 is permitted to take and what resources the client device 104 is permitted to consume. In the strictest sense, access controls limit what capabilities of the service (and of the service's servers 102) the client user device 104 may consume. Therefore, access controls are configured per service offering.

User Restrictions:

In situations where the service environment dictates, the authentication tokens 410 may specify user restrictions. User restrictions are independent of the capabilities of the service 102 offered but may result in the same consequences as access controls. For example, the authentication token 410 may be time-limited (expiring after a set time), geography limited (expiring if a client 104 departs a geographical region), or it may be revocable by the authenticating cloud computing enabling secure services (ACCESS) node 100 on demand or when the client 104 requests access to another service 102.

Figure 5:
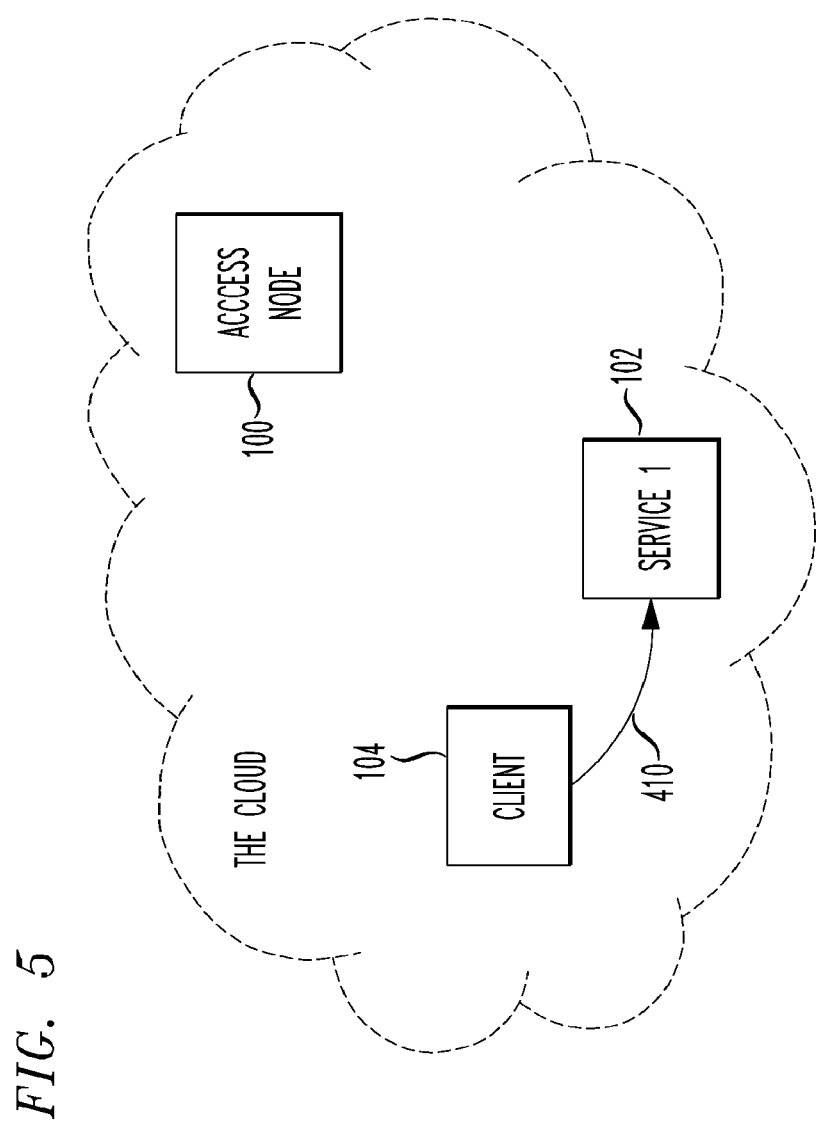
FIG. 5 shows an exemplary fifth step of a service request, for authenticating cloud computing enabling secure services (ACCESS), in accordance with the principles of the present invention.

FIG. 5 shows an exemplary fifth step of a service request, for authenticating cloud computing enabling secure services (ACCESS), in accordance with the principles of the present invention.

In particular, as shown in FIG. 5, finally, the client 104 directly contacts the service server 102 and sends the authentication token 410 to the service server 102. The client 104 uses the authentication token 410 to obtain service directly from the service server 102.

All the service server 102 has to do is check the validity of the authentication token 410 presented before it accepts the client requests (in this case by verifying the hashed signature included in the authentication token 410 matches what the service server 102 expects given the secret cryptographic keys 120 the service server 102 shared with the authenticating cloud computing enabling secure services (ACCESS) node 100), optionally check the identity of the client 104 against any messages received from the authenticating cloud computing enabling secure services (ACCESS) node 100 in the optional step of FIG. 3, parse the access authentication token 410 to determine which resources to provide to the client 104, and use the authentication token 410 to determine with what quality of service to provide those resources. The service server 102 then begins to perform work on behalf of the client 104.

No further interaction is required between the client 104 and the authenticating cloud computing enabling secure services (ACCESS) node 100, unless the client 104 later needs to expand its privileges or permissions by repeating the authentication process using a broader set of credentials 210.

Figure 6:
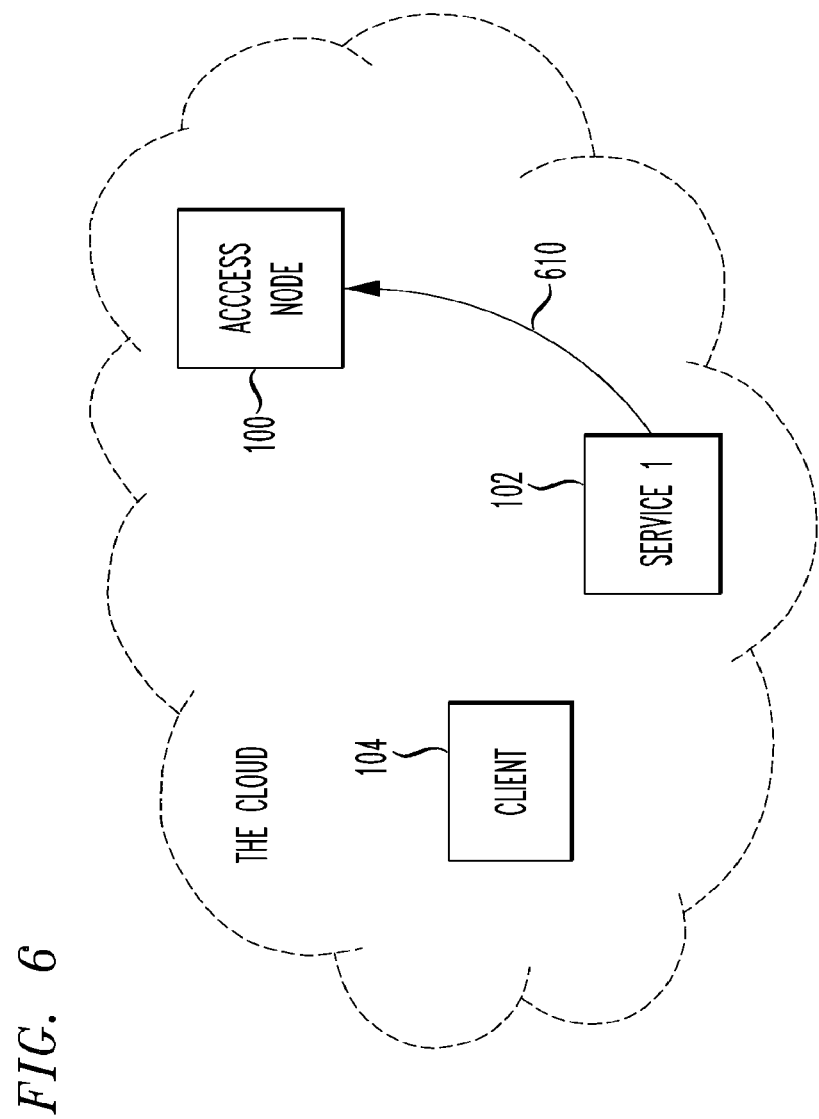
FIG. 6 shows an exemplary optional sixth step of a pull notification, of authenticating cloud computing enabling secure services (ACCESS), in accordance with the principles of the present invention.
Figure 7:
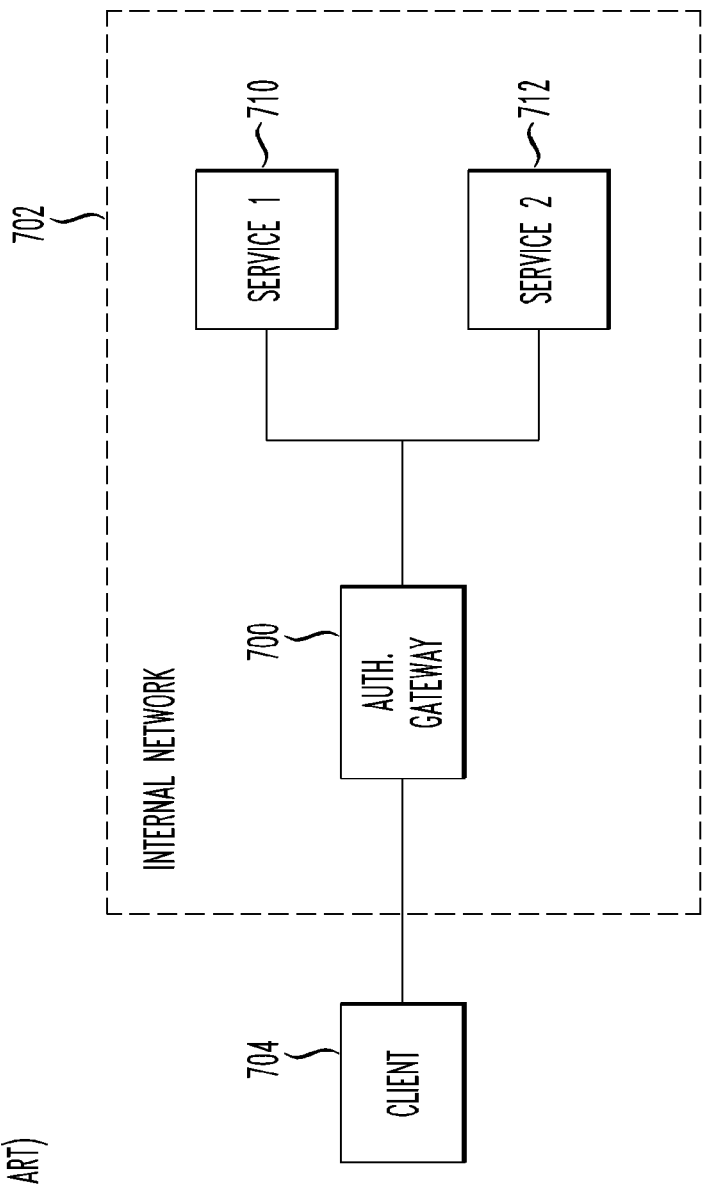
FIG. 7 shows conventional authentication wherein network-level traffic management policy requires inbound traffic to be forced to pass through a gateway device.

FIG. 6 shows an exemplary optional sixth step of a pull notification, of authenticating cloud computing enabling secure services (ACCESS), in accordance with the principles of the present invention.

In particular, as shown in FIG. 6, in an optional step, the service server 102 may contact the authenticating cloud computing enabling secure services (ACCESS) node 100 to verify the validity of the authentication token 410 or to obtain additional information about the authentication inputs and authentication decision.

The structure of the "push" or "pull" notification is based upon the information provided by the service server or service administrator 102 shown with respect to the step of service registration shown in FIG. 1, This structure remains valid until the service server 102 notifies the authenticating cloud computing enabling secure services (ACCESS) node 100 otherwise. These notifications may include any of the following information, in the form of explicitly declared key-value pairs:

Client identity (as observable by the server);
Server identity or identities (as requested by the client);
Values or summary of authentication credentials provided by the client;
Timestamps, including token creation time and length of token validity;
Nonce (to prevent token reuse);
Token type (single-use/valid-until-used, multiple-use);
Token exclusivity (whether the token may be used simultaneously with other tokens);
Server exclusivity (whether the token may be used simultaneously on multiple client requests);
Privileges granted (at client's level of authentication);
Quality of Service granted (at client's level of authentication); and/or
Custom key-value pairs (defined by the service administrator in the step show in FIG. 1.)

When either a "pull" or "push" step is selected by the service administrator of the service server 102, the authentication token 410 provided to the client 104 in FIG. 4 may contain only a subset of the key-value pairs 110. The authentication token 410 also may not contain the same hash values and protection schemes. Protection over the authentication transaction itself stems from the shared secret between the service's servers 102 and the authenticating cloud computing enabling secure services (ACCESS) node 100 as established in the step shown in FIG. 1.

The optional step of a pull notification shown and described with respect to FIG. 6 may or may not be used in conjunction with the optional additional step of a push notification shown and described with respect to FIG. 3. The step of pull notification may be mutually exclusive to the step of a push notification.

The disclosed architecture of authenticating cloud computing enabling secure services in accordance with the principles of the present invention provides security functions such as authentication, access control, and admission control. The use of ACCESS architecture also addresses the conventional problems of lack of scalability, server colocation, and inflexible architecture. The service's servers 102 may reside anywhere in the given cloud 50, as may the authenticating cloud computing enabling secure services (ACCESS) node(s) 100, without reducing either the performance of the client-server link or reducing the security functions achieved.

The invention has particular applicability to the mobile handheld market (both for cellular telephones and other personal mobile devices), especially with respect to these devices communicating directly with end services and bypassing the cellular telecommunications networks. It also has applicability to the general-purpose computing market, both for consumer/business workstations accessing cloud services & for server systems that in turn use backend services provided in the cloud.

The authenticating cloud computing enabling secure services method and architecture of the present invention may be implemented such that the highest point-to-point performance between a given client and a given cloud-enabled service may be achieved. The invention has applicability to both end-client application developers (who might include ACCESS technologies in their applications or products) as well as any company that "resells" authentication as a third-party service, e.g., to such application developers.

U.S. application Ser. No. 13/506,418, entitled "Usage Authentication via Intercept and Challenge For Network Services", filed Apr. 18, 2012, to McFarland et al., and having common Assignment to the present application, has applicability to the present invention, and is incorporated herein by reference.

While the invention has been described with reference to the exemplary embodiments thereof, those skilled in the art will be able to make various modifications to the described embodiments of the invention without departing from the true spirit and scope of the invention.

What is claimed is:

1. A method of pre-authenticating a client device for direct access to a cloud-based secure service, comprising:
   receiving a registration message from a client device, at an access node separate from a cloud-based secure service server, said registration message being encrypted using a cryptographic key, wherein said registration message comprises a unique service instance identifier;
   passing a pre-authorized authentication token together with a redirect to said client device, said pre-authorized authentication token for provision by said client device directly to said cloud-based secure service server without passage through said access node, wherein said pre-authorized authorization token comprises a set of key-value pairs containing credentials for said client device;
   providing a notification, when authenticated, from said access node to said cloud-based secure service server, said notification identifying said client device;
   providing said cloud-based secure service server with a list of security items to enforce; and
   receiving a request at said access node, from said cloud-based secure service server, to verify validity of said pre-authorized authentication token received by said cloud-based secure service server from said client device;
   whereby said client device directly provides said pre-authorized authorization token to said cloud-based secure service server bypassing said access node to directly access said cloud-based secure service server.

2. The method of pre-authenticating a client device for direct access to a cloud-based secure service according to claim 1, wherein: said request from said cloud-based secure service server requests additional information regarding authentication of said client device to access a cloud-based secure service on said cloud-based secure service server.

3. The method of pre-authenticating a client device for direct access to a cloud-based secure service according to claim 1, wherein: said access node is a third-party with respect to said cloud-based secure service server.

4. The method of pre-authenticating a client device for direct access to a cloud-based secure service according to claim 1, wherein: all communications between said client device and said cloud-based secure service server involves encrypted transport.

5. The method of pre-authenticating a client device for direct access to a cloud-based secure service according to claim 1, wherein said credentials comprise: passwords.

6. The method of pre-authenticating a client device for direct access to a cloud-based secure service according to claim 1, wherein said credentials comprise: biometric data about an authorized user of said client device.

7. The method of pre-authenticating a client device for direct access to a cloud-based secure service according to claim 1, wherein said credentials comprise: a current location of said client device.

8. The method of pre-authenticating a client device for direct access to a cloud-based secure service according to claim 1, wherein said credentials comprise: a direction of travel of said client device.

9. The method of pre-authenticating a client device for direct access to a cloud-based secure service according to claim 1, wherein said credentials comprise: previous locations of said client device.

10. The method of pre-authenticating a client device for direct access to a cloud-based secure service according to claim 1, wherein said credentials comprise: historical records regarding previous successful authentications by said client device.

11. The method of pre-authenticating a client device for direct access to a cloud-based secure service according to claim 1, wherein said credentials comprise: a seeded pseudorandom number generator.

12. The method of pre-authenticating a client device for direct access to a cloud-based secure service according to claim 1, wherein said security items comprise: a set of secret cryptographic keys.

13. The method of pre-authenticating a client device for direct access to a cloud-based secure service according to claim 1, wherein said security items comprise: a set of secret cryptographic certificates.

14. The method of pre-authenticating a client device for direct access to a cloud-based secure service according to claim 1, wherein said security items comprise: a list of users, roles and principals.

15. The method of pre-authenticating a client device for direct access to a cloud-based secure service according to claim 1, wherein said security items comprise: resources to be utilized and protected.

16. The method of pre-authenticating a client device for direct access to a cloud-based secure service according to claim 1, wherein said registration message further comprises: a service identifier status.

17. The method of pre-authenticating a client device for direct access to a cloud-based secure service according to claim 16, wherein said registration message further comprises: a notification method.

18. The method at pre-authenticating a client device for direct access to a cloud-based secure service according to claim 1, wherein: said cryptographic key is exchanged between said cloud-based secure service and said client device out-of-band.

* * * * *